United States Patent
Tanaka

(10) Patent No.: US 9,567,924 B2
(45) Date of Patent: Feb. 14, 2017

(54) CONTROLLER FOR INTERNAL COMBUSTION ENGINE WITH SUPERCHARGER

(75) Inventor: Satoru Tanaka, Odawara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/402,357

(22) PCT Filed: May 23, 2012

(86) PCT No.: PCT/JP2012/063194
§ 371 (c)(1),
(2), (4) Date: Nov. 20, 2014

(87) PCT Pub. No.: WO2013/175589
PCT Pub. Date: Nov. 28, 2013

(65) Prior Publication Data
US 2015/0144114 A1    May 28, 2015

(51) Int. Cl.
F02B 33/44    (2006.01)
F02B 33/00    (2006.01)
G06F 19/00    (2011.01)
F02D 41/00    (2006.01)
F02D 23/00    (2006.01)
F02D 41/18    (2006.01)
F02D 41/10    (2006.01)
F02D 41/14    (2006.01)

(52) U.S. Cl.
CPC ......... F02D 41/0007 (2013.01); F02D 23/005 (2013.01); F02D 41/18 (2013.01); F02D 41/10 (2013.01); F02D 2041/1433 (2013.01); F02D 2041/1434 (2013.01); F02D 2200/0402 (2013.01); F02D 2200/0408 (2013.01); F02D 2200/0411 (2013.01); F02D 2250/22 (2013.01); Y02T 10/144 (2013.01)

(58) Field of Classification Search
CPC ......... F02D 41/0007; F02D 9/02; F02D 23/00
USPC .................................... 60/611; 701/102–103
See application file for complete search history.

(56) References Cited

U.S. PATENT DOCUMENTS

| 7,677,227 B2* | 3/2010 | Sagisaka et al. ............... 60/611 |
| 7,865,292 B2* | 1/2011 | Sato ............................... 60/611 |
| 2006/0102144 A1 | 5/2006 | Muto et al. |

(Continued)

FOREIGN PATENT DOCUMENTS

| JP | 2006-144565 A | 6/2006 |
| JP | 2006-348778 A | 12/2006 |

(Continued)

Primary Examiner — Nicholas J Weiss
Assistant Examiner — Ngoc T Nguyen
(74) Attorney, Agent, or Firm — Andrews Kurth Kenyon LLP

(57) ABSTRACT

An internal combustion engine having a controller for controlling the propriety of the target throttle opening degree is confirmed with a reference throttle opening degree as a reference by a monitoring device. The target throttle opening degree is calculated based on a target intake air quantity and a measured value or an estimated value of a supercharging pressure by using an inverse model of an air model expressing a dynamic relation that is established among the supercharging pressure, a throttle opening degree and an intake air quantity, by a first arithmetic unit.

1 Claim, 1 Drawing Sheet

(56) References Cited

U.S. PATENT DOCUMENTS

2006/0277907 A1 12/2006 Ueda et al.
2008/0091331 A1 4/2008 Kawai

FOREIGN PATENT DOCUMENTS

| JP | 2008-095596 A | 4/2008 |
| JP | 2010-106762 A | 5/2010 |

* cited by examiner

CONTROLLER FOR INTERNAL COMBUSTION ENGINE WITH SUPERCHARGER

CROSS-REFERENCE TO RELATED APPLICATION

This is a national phase application based on the PCT International Patent Application No. PCT/JP2012/063194 filed May 23, 2012, the entire contents of which are incorporated herein by reference.

TECHNICAL FIELD

The present invention relates to a controller for an internal combustion engine with a supercharger that calculates a target throttle opening degree to be given to an electronically controlled throttle by using an inverse model of an air model, and more particularly relates to a controller including a function of monitoring whether the target throttle opening degree is out of an appropriate range.

BACKGROUND ART

As a method for calculating a target throttle opening degree to be given to an electronically controlled throttle, there is known a method that uses an inverse model of an air model. An air model is a dynamic model that expresses a dynamic relation established between a throttle opening degree and an intake air quantity. If the inverse model of an air model, that is, an inverse air model is used, the throttle opening degree that is required to achieve a target intake air quantity can be inversely calculated.

The calculation method of the target throttle opening degree with use of an inverse air model also can be applied to an internal combustion engine with a supercharger. Note, however, in an internal combustion engine with a supercharger, the pressure that acts on the upstream side of the throttle changes in accordance with the supercharging state of the supercharger. A throttle upstream pressure is an important parameter that is used in calculation of a target throttle opening degree in an inverse air model. Therefore, in calculation of the inverse air model for an internal combustion engine with a supercharger, the supercharging pressure measured by a supercharging pressure sensor or the supercharging pressure that is estimated by a physical model is used as the throttle upstream pressure.

According to the method for calculating the target throttle opening degree by using an inverse air model, even when the target intake air quantity changes, the throttle opening degree that is required to achieve it can be calculated with high precision. However, in the calculation using the inverse air model that is a dynamic model, the target throttle opening degree which is an output value significantly changes with respect to a change of an input value. Therefore, there is a possibility of the target throttle opening degree to be given to the electronically controlled throttle being out of the appropriate range which is set in advance, depending on the condition of the input value. In particular, in the case of the inverse air model of an internal combustion engine with a supercharger, there is a fear that some sort of problem occurs to the supercharging pressure which is inputted. For example, when the supercharging pressure is measured by a supercharging pressure sensor, there is a possibility that the measured value of the supercharging pressure becomes inaccurate due to the problem of the supercharging pressure sensor (for example, wire breakage, deterioration of the sensor element, or the like).

It is not preferable in the control performance of an internal combustion engine that the target throttle opening degree to be given to the electronically controlled throttle is out of the appropriate range which is set in advance. Therefore, the controller of an internal combustion engine, in particular, the controller of an internal combustion engine with a supercharger is required to always monitor whether the target throttle opening degree is not out of an appropriate range.

CITATION LIST

Patent Literature

Patent Literature 1: Japanese Patent Laid-Open No. 2008-095596
Patent Literature 2: Japanese Patent Laid-Open No. 2010-106762
Patent Literature 3: Japanese Patent Laid-Open No. 2006-348778

SUMMARY OF INVENTION

The present invention is made in the light of the aforementioned problem, and has an object to enable monitoring whether a target throttle opening degree to be given to an electronically controlled throttled is not out of an appropriate range, in a controller for an internal combustion engine with a supercharger.

A controller according to the present invention confirms propriety of a target throttle opening degree to be given to an electronically controlled throttle with a reference throttle opening degree as a reference, by a monitoring device. A first arithmetic unit performs calculation of the target throttle opening degree. The first arithmetic unit calculates a target throttle opening degree based on a target intake air quantity and a measured value or an estimated value of a supercharging pressure, by using an inverse model of an air model that expresses a dynamic relation that is established among the supercharging pressure, a throttle opening degree and an intake air quantity. A second arithmetic unit performs calculation of a reference throttle opening degree. The second arithmetic unit calculates a reference throttle opening degree based on the target intake air quantity and a measured value or an estimated value of an atmospheric pressure, by using a relational expression established between the intake air quantity and an intake pipe pressure in a steady state, and a relational expression that is established among a throttle upstream pressure, the intake pipe pressure and a throttle flow rate in a steady state.

According to the controller according to the present invention, in calculation of the reference throttle opening degree which is used to confirm propriety of the target throttle opening degree, an atmospheric pressure is used, instead of a supercharging pressure. Since the supercharging pressure is higher than an atmospheric pressure, the target throttle opening degree that is measured based on the supercharging pressure should be smaller than the reference throttle opening degree which is calculated based on the atmospheric pressure. Accordingly, by evaluating a value of the target throttle opening degree with the reference throttle opening degree as a reference, propriety of the target throttle opening degree calculated by the first arithmetic unit can be confirmed. Further, by using an atmospheric pressure, even when a deviation occurs to the measured value or the estimated value of the supercharging pressure, the reference throttle opening degree can be calculated correctly. Furthermore, according to the controller according to the present invention, the reference throttle opening degree is calculated by using two relational expressions that are simultaneously established in a steady state, instead of a dynamic model like an inverse model of an air model. Thereby, an arithmetic load can be reduced as compared with the case of using a dynamic model.

Further, the controller according to the present invention more preferably includes a corrector that is constituted of an inverse first-order lag model in the second arithmetic unit. The second arithmetic unit corrects the calculated reference throttle opening degree by using the inverse first-order lag model, and outputs the reference throttle opening degree after correction. By correction by the inverse first-order lag model, the waveform of the reference throttle opening degree is in a shape closer to the waveform of the target throttle opening degree that is calculated by using the dynamic model. Accordingly, by confirming propriety of the target throttle opening degree to be given to the electronically controlled throttle with the reference throttle opening after correction as a reference, erroneous determination is prevented, and precision of monitoring can be more enhanced.

DESCRIPTION OF EMBODIMENTS

An embodiment of the present invention will be described with reference to the drawings.

An internal combustion engine to which a controller according to the present embodiment is applied is a four cycle reciprocating engine that includes a supercharger such as a turbocharger and a mechanical supercharger, and can control torque by adjustment of an air quantity by an electronically controlled throttle (hereinafter, abbreviated simply as a throttle). The controller according to the present embodiment is realized as one function of an ECU included by an internal combustion engine. In more detail, the program stored in a memory is executed by a CPU, whereby the ECU functions as the controller. When the ECU functions as the controller, the ECU controls an operation of the throttle in accordance with throttle control logic which is programmed.

Figure 1:
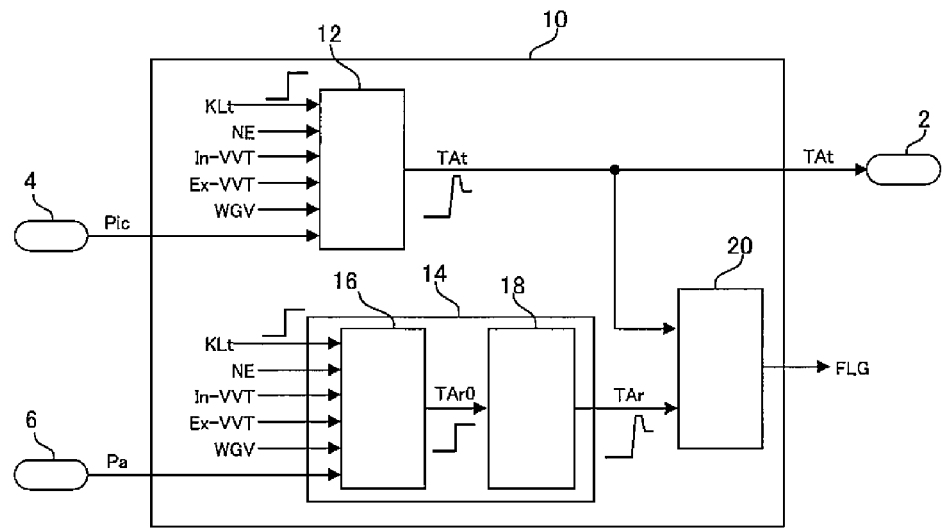
FIG. 1 is a functional block diagram showing a configuration of a controller according to an embodiment of the present invention.

FIG. 1 is a functional block showing a configuration of the controller which is realized by the ECU functioning in accordance with the throttle control logic. As shown in FIG. 1, a controller 10 according to the present embodiment acquires respective output values of a supercharging pressure sensor 4 and an atmospheric pressure sensor 6, and gives a target throttle opening degree (TAt) to a throttle 2. The supercharging pressure sensor 4 is mounted downstream of a compressor and upstream of the throttle in an intake passage. The atmospheric pressure sensor 6 is mounted to an inlet of the intake passage. From an output value of the supercharging pressure sensor 4, a supercharging pressure (Pic) which acts on an upstream side of the throttle 2 can be measured, and from an output value of the atmospheric pressure sensor 6, an atmospheric pressure (Pa) which acts on the inlet of the intake passage can be measured.

The controller 10 according to the present embodiment is configured by a first arithmetic unit 12, a second arithmetic unit 14 and a monitoring device 20. These devices 12, 14 and 20 are devices that are realized on software by the throttle control logic being executed by the CPU of the controller 10. As a matter of course, these devices 12, 14 and 20 may be each configured by exclusive hardware.

The first arithmetic unit 12 calculates the target throttle opening degree (TAt) to be given to the throttle 2 based on a target intake air quantity (KLt) and other kinds of engine information. The other kinds of engine information include an engine speed (NE), intake valve timing (In-VVT), exhaust valve timing (Ex-VVT), a waste gate valve opening degree (WGV), and the supercharging pressure (Pic) that is measured by the supercharging pressure sensor 4. The first arithmetic unit 12 uses an inverse air model in calculation of the target throttle opening degree (TAt). Details of a calculation method of the target throttle vale opening degree (TAt) using an inverse air model will be described later.

The second arithmetic unit 14 calculates a reference throttle opening degree (TAr) based on the target intake air quantity (KLt) and other kinds of engine information. The reference throttle opening degree (TAr) is used for confirmation of propriety of the target throttle opening degree (TAt) in the monitoring device 20 which will be described later. The engine information that is used in calculation of the reference throttle opening degree (TAr) is similar to the engine information that is used in the first arithmetic unit 12. However, in the second arithmetic unit 14, the atmospheric pressure (Pa) that is measured by the atmospheric pressure sensor 6 is used as the engine information, in place of the supercharging pressure (Pic) that is measured by the supercharging pressure sensor 4.

In more detail, the second arithmetic unit 14 is configured by a basic arithmetic unit 16 and a corrector 18. The basic arithmetic unit 16 is an element that calculates a basic value (TAr0) of the reference throttle opening degree (TAr), and the corrector 18 is an element that corrects the basic value (TAr0) which is calculated by the basic arithmetic unit 16. The second arithmetic unit 14 outputs the basic value (TAr0) corrected by the corrector 18 as the reference throttle opening degree (TAr). Note that the basic arithmetic unit 16 calculates the basic value (TAr0) of the reference throttle opening degree by using two relational expressions that are simultaneously established in a steady state. The corrector 18 uses an inverse first-order lag model in correction of the basic value (TAr0). Details of the calculation method of the reference throttle opening degree (TAr) by the second arithmetic unit 14 will be described later.

The monitoring device 20 confirms propriety of the target throttle opening degree (TAt) calculated in the first arithmetic unit 12 with the reference throttle opening degree (TAr) calculated in the second arithmetic unit 14 as a reference. More specifically, the monitoring device 20 sets a value that is smaller than the reference throttle opening degree (TAr) by a predetermined value as a lower limit value of an appropriate range, and sets a value that is larger than the reference throttle opening degree (TAr) by a predetermined value as an upper limit value of the appropriate range. If the target throttle opening degree (TAt) is included in the appropriate range that is fixed by the lower limit value and the upper limit value, the monitoring device 20 determines that the value of the target throttle opening degree (TAt) is appropriate. Conversely, if the target throttle opening degree (TAt) is out of the appropriate range, the monitoring device 20 determines that the target throttle opening degree (TAt) is not appropriate, and switches a value of a predetermined flag (FLG) to one from zero (namely, sets the flag to be on). When the flag is set to be on, the ECU records a code corresponding to the flag in the memory. The recorded code can be read by a diagnosis device at a time of inspection of a vehicle.

Next, details of the inverse air model that is used in the first arithmetic unit 12 will be described by using FIG. 2. The inverse air model is an inverse model of an air model that expresses a dynamic relation that is established between the throttle opening degree and the intake air quantity. Since the controller 10 according to the present embodiment sets the internal combustion engine with a supercharger as a control target, the supercharging pressure (Pic) is used as one input value of the inverse air model, in addition to the target intake air quantity (KLt).

Figure 2:
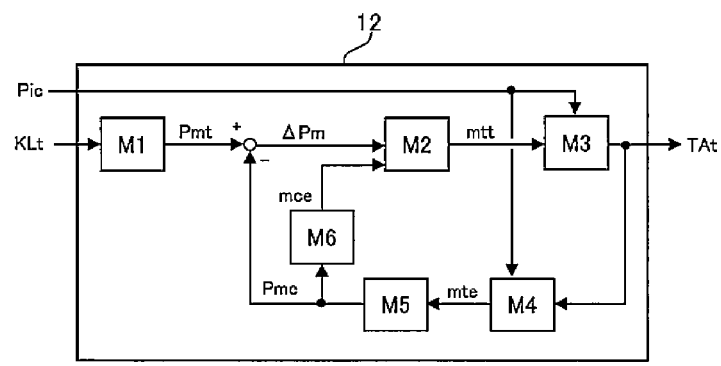
FIG. 2 is a functional block diagram showing details of an inverse air model which is used by a first arithmetic unit of the controller shown in FIG. 1.

As shown in FIG. 2, the inverse air model according to the present embodiment is configured by combining a plurality of element models M1, M2, M3, M4, M5 and M6. In more detail, the inverse air model is configured by the inverse intake valve model M1, the inverse intake pipe model M2, the inverse throttle model M3, the throttle model M4, the intake pipe model M5 and the intake valve model M6. Hereinafter, contents of the respective element models will be described.

The inverse intake valve model M1 is a model based on a result of an experiment investigating a relation of the intake air quantity and an intake pipe pressure. In the inverse intake valve model M1, the relation of the intake air quantity and the intake pipe pressure is approximated by expression 1 as follows. In expression 1, a and b are coefficients that are fixed in response to the engine speed (NE), the intake valve timing (In-VVT), the exhaust valve timing (Ex-VVT) and the waste gate valve opening (WGV) respectively. The ECU stores a map that relates the engine information thereof and values of the respective coefficients a and b. By inputting the target intake air quantity (KLt) into the inverse intake valve model M1, a target intake pipe pressure (Pmt) for achieving the target intake air quantity (KLt) is calculated.

[Expression 1]

$$Pmt = (KLt + b)/a \qquad \text{Expression 1}$$

The inversed intake pipe model M2 is a physical model that is constructed based on a law of conservation relating to air in an intake pipe, more specifically, an energy conservation law and a flow rate conservation law. In the inverse intake pipe model M2, a pressure deviation (ΔPm) that is calculated by expression 2 as follows, and an estimated intake valve flow rate (mce) that is calculated in the intake valve model M6 which will be described later are inputted. In expression 2, Pme represents an estimated intake pipe pressure that is calculated in the intake pipe model M5 which will be described later. The inverse intake pipe model M2 calculates a target throttle flow rate (mtt) for achieving the target intake pipe pressure (Pmt) by expression 3 as follows based on the input information. Note that in expression 3, Tic represents a throttle upstream temperature, Vm represents an intake pipe capacity, Δt represents a calculation time interval, K represents a specific heat ratio, R represents a gas constant, and Tm represents an intake pipe temperature.

$$\Delta Pm = Pmt - Pme \qquad \text{Expression 2}$$

$$mtt = \frac{1}{Ta} * \left( \Delta Pm * \frac{Vm}{\Delta t * \kappa * R} + mce * Tm \right) \qquad \text{Expression 3}$$

The inverse throttle model M3 is a physical model expressing a relation of a throttle flow rate and a throttle opening degree. In the case of an internal combustion engine with a supercharger, if the supercharging pressure changes even with the same throttle opening degree, the throttle flow rate also changes. Accordingly, in the inverse throttle model M3, the supercharging pressure (Pic) that is measured by the supercharging pressure sensor 4 is used as one parameter. The inverse throttle model M3 is more specifically expressed by expression 4 as follows that is an expression of throttle. A function $B^{-1}$ and a function $\phi$ in expression 4 are known to the public, and therefore, explanation thereof will be omitted here. By inputting the target throttle flow rate (mtt) and the supercharging pressure (Pic) into the inverse throttle model M3, the target throttle opening degree (TAt) for achieving the target throttle flow rate (mtt) is calculated.

$$TAt = B^{-1}\left( mtt \bigg/ \frac{Pic}{\sqrt{R * Tic}} * \Phi(Pm/Pic) \right) \qquad \text{Expression 4}$$

The throttle model M4, the intake pipe model M5 and the intake valve model M6 are provided to calculate the estimated intake air quantity (Pme) and the estimated intake valve flow rate (mce) which are used in the aforementioned calculation process. The throttle model M4 is a forward model corresponding to the aforementioned inverse throttle model M3. In calculation using the throttle model M4, the supercharging pressure (Pic) measured by the supercharging pressure sensor 4 is inputted for a parameter of the throttle model M4 similarly to the case of the inverse throttle model M3. By inputting the target throttle opening degree (TAt) into the throttle model M4, a present estimated throttle flow rate (mte) is calculated. Further, the intake pipe model M5 is a forward model corresponding to the aforementioned inverse intake pipe model M2, and calculates the estimated intake pipe pressure (Pme) by input of the estimated throttle flow rate (mte). The intake valve model M6 is a forward model corresponding to the aforementioned inverse intake valve model M1, and calculates an estimated intake valve flow rate (mce) by input of the estimated intake pipe pressure (Pme). Note that the intake valve flow rate is proportional to the intake air quantity. As described above, the estimated intake pipe pressure (Pme) is used in calculation of the pressure deviation (ΔPm), and the estimated intake valve flow rate (mce) is inputted into the inverse intake pipe model M2 together with the pressure deviation (ΔPm).

Next, the calculation method of the reference throttle opening degree (TAr) by the second arithmetic unit 14 will be described. First, a calculation method of the basic value (TAr0) of the reference throttle opening degree by the basic arithmetic unit 16 will be described. The basic arithmetic unit 16 calculates the basic value (TAr0) of the reference throttle opening degree by using two relational expressions. A first relational expression is a relational expression that is established between the intake air quantity and the intake pipe pressure in a steady state, and the same expression as expression 1 that is used in the inverse intake valve model M1 is used. A second relational expression is a relational expression that is established between the throttle upstream pressure, the intake pipe pressure and the throttle flow rate in a steady state, and the expression of throttle is used similarly to the inverse throttle model M3. While in expression 4 that is used in the inverse throttle model M3, the supercharging pressure (Pic) is substituted as the throttle upstream pressure, in the second relational expression used by the basic arithmetic unit 16, the atmospheric pressure (Pa) which is measured by the atmospheric pressure sensor 6 is substituted as the throttle upstream pressure.

Figure 3:
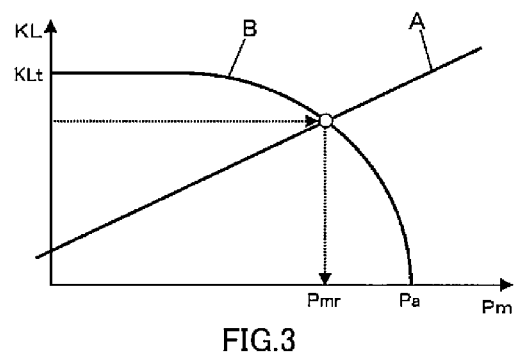
FIG. 3 is a diagram for explaining a calculation method of a reference throttle opening degree by a second arithmetic unit of the controller shown in FIG. 1.

The basic arithmetic unit 16 calculates the basic value (TAr0) of the reference throttle opening degree by solving simultaneous equations constituted of the first relational expression and the second relational expression. The axis of abscissa of a graph shown in FIG. 3 represents the intake pipe pressure (Pm), and the axis of ordinates represents the intake air quantity (KL). In the graph, a straight line A and a curve B are drawn. The straight line A expresses the first relational expression, whereas the curve B expresses the second relational expression. A gradient and an intercept of the straight line A correspond to the coefficients a and b in expression 1, and the gradient and the intercept are fixed by the engine speed (NE), the intake valve timing (In-VVT), the exhaust valve timing (Ex-VVT) and the waste gate valve opening degree (WGV). By substituting the target intake air quantity (KLt) in the first relational expression which expresses the straight line A, whereby the reference intake pipe pressure (Pmr) corresponding to the target intake air quantity (KLt) is calculated. Subsequently, the target intake air quantity (KLt) and the reference intake pipe pressure (Pmr) are substituted into the second relational expression, which expresses the curve B, together with the atmospheric pressure (Pa), whereby the basic value (TAr0) of the reference throttle opening degree is calculated.

Note that depending on the value of the target intake air quantity (KLt), the reference intake pipe pressure (Pmr) which is calculated from the first relational expression sometimes exceed the atmospheric pressure (Pa). In such a case, an effective throttle opening degree cannot be obtained from the second relational expression. Therefore, when the reference intake pipe pressure (Pmr) exceeds the atmospheric pressure (Pa), the basic arithmetic unit 16 calculates a full open value as the basic value (TAr0) of the reference throttle opening degree.

The basic value (TAr0) of the reference throttle opening degree which is calculated in this manner is corrected by using the inverse first-order lag model, that is, a first-order advance model by the corrector 18. Correction by the inverse first-order lag model is performed in order to realize overshooting movement or undershooting movement of the target throttle opening degree (TAt) at a time of abrupt change of the target intake air quantity (KLt), with the reference throttle opening degree (TAr).

For example, as shown in FIG. 1, when the target intake air quantity (KLt) increases in a step response manner, the target throttle opening degree (TAt) which is calculated in the first arithmetic unit 12 temporarily increases in an overshooting manner, and thereafter, becomes an opening degree corresponding to the target intake air quantity (KLt) after the increase. This is to increase the intake air quantity having a response delay with respect to the movement of the throttle 2 as early as possible. Meanwhile, the basic value (TAr0) of the reference throttle opening degree which is calculated in the basic arithmetic unit 16 increases in a step response manner similarly to the target intake air quantity (KLt). However, by processing the basic value (TAr0) by the inverse first-order lag model, the reference throttle opening degree (TAr) that changes in an overshooting manner can be obtained similarly to the target throttle opening degree (TAt). Note that in the inverse first-order lag model, a time constant is present, and the time constant is adapted so that a waveform of the reference throttle opening degree (TAr) closely resembles a waveform of the target throttle opening degree (TAt).

Explanation of the configuration of the controller 10 according to the present embodiment is as above. As is understandable from the explanation, the controller 10 according to the present embodiment uses the atmospheric pressure (Pa) instead of the supercharging pressure (Pic) as the throttle upstream pressure, in calculation of the reference throttle opening degree (TAr) which is used to confirm propriety of the target throttle opening degree (TAt). As long as the supercharging pressure sensor 4 is normal, the atmospheric pressure (Pa) is lower than the supercharging pressure (Pm), and therefore, the reference throttle opening degree (TAr) that is calculated based on the atmospheric pressure (Pa) is set at a value larger than the target throttle opening degree (TAt) that is calculated based on the supercharging pressure (Pic). Therefore, the reference throttle opening degree (TAr) is taken as the reference for determination, whereby whether the target throttle opening degree (TAt) is too large, namely, the propriety thereof can be correctly determined.

Further, there is an advantage of being able to calculate the reference throttle opening degree (TAr) correctly even when a problem occurs to the supercharging pressure sensor 4 in using the atmospheric pressure (Pa) in calculation of the reference throttle opening degree (TAr). As a result that the reference throttle opening degree (TAr) is calculated correctly, making erroneous determination concerning propriety of the target throttle opening degree (TAt) can be avoided.

Furthermore, the controller 10 according to the present embodiment uses the two relational expressions that are simultaneously established in a steady state, instead of a dynamic model like an inverse air model, in the calculation of the reference throttle opening degree (TAr). This has an advantage of being capable of reducing an arithmetic load of the ECU as compared with the case of using a dynamic model.

Note that the present invention is not limited to the aforementioned embodiment, and can be carried out by being variously modified within a range without departing from the gist of the present invention. For example, the atmospheric pressure is not measured by the atmospheric pressure sensor, but may be estimated from other kinds of information. The same applies to the supercharging pressure, and the supercharging pressure is not measured by the supercharging pressure sensor, but the supercharging pressure may be estimated from other kinds of information. In estimation thereof, a physical model can be used.

REFERENCE SIGNS LIST

2 Electronically controlled throttle
4 Supercharging pressure sensor
6 Atmospheric pressure sensor
10 Controller
12 First arithmetic unit
14 Second arithmetic unit 16 Basic arithmetic unit
18 Corrector
20 Monitoring device
M1 Inverse intake valve model
M2 Inverse intake pipe model
M3 Inverse throttle model
M4 Throttle model
M5 Intake pipe model
M6 intake valve model

The invention claimed is:

1. A supercharged internal combustion engine comprising:
   an electronically controlled throttle; and
   a controller having executable instructions stored in a non-transitory memory for:
   calculating a target throttle opening degree to be given to the electronically controlled throttle based on a target intake air quantity and a measured value or an estimated value of a supercharging pressure, by using an inverse model of an air model that expresses a dynamic relation that is established among the supercharging pressure, a throttle opening degree and an intake air quantity via a first arithmetic unit;
   calculating a reference throttle opening degree based on the target intake air quantity and a measured value or an estimated value of an atmospheric pressure, by using a relational expression established between the intake air quantity and an intake pipe pressure in a steady state, and a relational expression that is established among a throttle upstream pressure, the intake pipe pressure and a throttle flow rate in a steady state via a second arithmetic unit,
   correcting the calculated reference throttle opening degree by using an inverse first-order lag model via a corrector of the second arithmetic unit,
   generating an output of the reference throttle opening degree after being corrected by the corrector to a monitoring device,
   confirming propriety of the target throttle opening degree that is calculated by the first arithmetic unit with the reference throttle opening degree calculated by the second arithmetic unit as a reference via the monitoring device, and
   adjusting a position of the electronically controlled throttle according to the target throttle opening degree.

* * * * *